Patented Oct. 30, 1928.

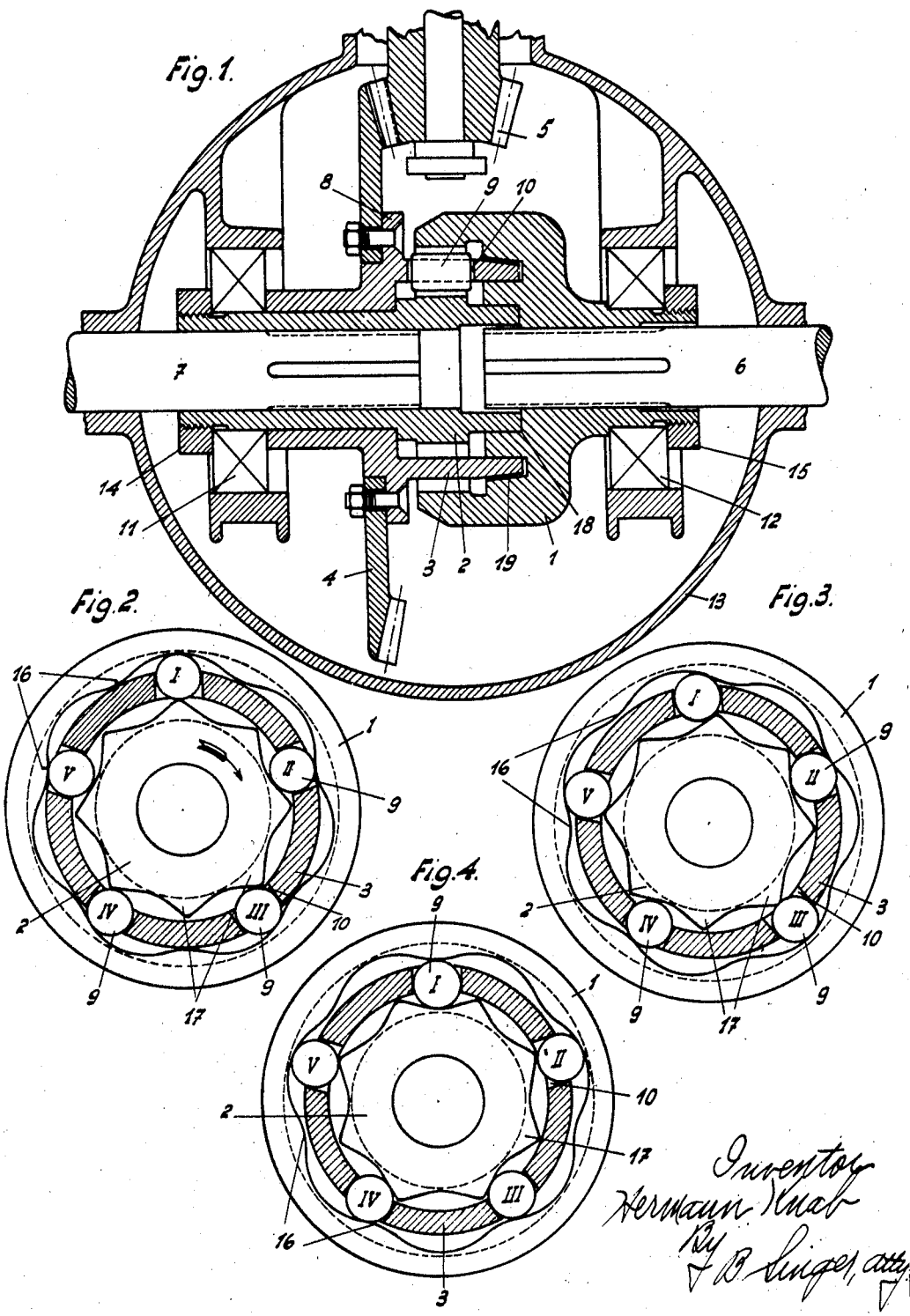

1,689,285

UNITED STATES PATENT OFFICE.

HERMANN KNAB, OF NUREMBERG, GERMANY, ASSIGNOR OF ONE-HALF TO GOTTFRIED WEIDMANN-MEIER, OF ZURICH, SWITZERLAND.

DIFFERENTIAL GEAR FOR SELF-PROPELLED VEHICLES.

Application filed July 29, 1926. Serial No. 125,759, and in Germany October 6, 1925.

This invention relates to automobiles, motor cars and other self-propelled vehicles, but more particularly to the transmission mechanism of such vehicles.

An object of this invention is the production of a differential gearing combined with the rear axle of the vehicle in which gearing the two parts of the bisected rear axle carrying the hind wheels are held in engagement with each other by means of rotary bodies in such a manner that although each wheel shaft may turn freely and independently of the other they nevertheless are positively driven by the motor in each of their relative positions.

A further object is the production of a differential gear which is cheap, compact, light, durable and noiseless in action.

These and other objects I attain in a mechanism embodying the features herein described and illustrated in the drawings accompanying this application and forming part thereof.

In the drawings:

Fig. 1 is a sectional side elevation of the new device illustrated in a diagrammatical manner.

Figs. 2 to 4 illustrate the co-operation of the different parts of the gear.

In the drawings 6 and 7 denote shafts, on each of which a hind wheel is fastened in the well known manner. To the shaft 6 a bell shaped coupling part 1 is keyed having a flange projecting inwardly. Said flange is provided with a plurality of cams 16. To shaft 7 a second coupling part 2 is keyed, said part 2 being provided with an outwardly projecting flange with a plurality of cams 17. The cams 16 and 17 are positioned in a common plane perpendicular to the shafts 6, 7. Between the cams 16, 17 projects a cage 3 which is rotatably mounted on the boss of the part 2. The cage 3 is provided with an outwardly projecting flange 8 on to which the toothed rim 4 is firmly screwed. The gear 4 meshes with the pinion 5 which is driven by the motor in the well known manner. The cage 3 is provided with five equally spaced radial openings 10 in each of which a roller 9 is rotatably mounted. The five rollers 9 are in engagement with the seven cams 16 and with eight cams 17 of the two coupling parts 1, 2. The said parts 1, 2 run on ball bearings 11, 12 held in supports of a casing 13 by means of the rings 14, 15, part 2 engaging a recess 18 of part 1. The cage 3 engages a groove 19 in part 1 and finds there a good bearing.

The number of cams 16 differs from the number of cams 17 by one and by these means I obviate that in any position of the parts 1, 2 the rollers 9 may pass between the said parts, the parts 1 and 2 are coupled in any of their relative position.

To get a favorable and equal distribution of the torque during the transmission of power I increase the number of the cams as far as practicable there being always a difference in the number of the cams, this difference is however to be but small, preferably there is a difference of only one cam.

I prefer to give the inner part 2 the greater number of cams 17. The cams 17 receive thereby comparatively and relatively steep faces and the component of force in tangential direction is approximately equal on the both parts 1 and 2.

In Figs. 2 to 4 some different relative positions of the two parts 1 and 2 are shown. In Fig. 2 it is assumed that the part 2 precedes part 1 in the direction shown by the arrow. The roller I is on top of a cam 17 while the rollers II, IV are on descending faces and rollers III and V on ascending faces of the cams. If the part 2 is driving, the rollers assume the positions as shown in Fig. 3, the rollers I and IV are descending and the rollers II and V are ascending on the cams while roller III is on top of a cam 17. If part 1 is still going further with reference to part 2 and in the same direction the rollers will assume the positions shown in Fig. 4. Roller I is now on the bottom of a cam, the rollers II and IV are moving upwards to the top position and the rollers III and V go downwards etc. It will be seen from these diagrams that there is no position in which the parts 1 and 2 are out of engagement.

While I have described the principle of operation of my invention together with a device, which I now consider to represent the best embodiment thereof I wish to have it understood that the device shown is only illustrative and that the invention can be carried out by other means.

What I wish to secure by U. S. Letters Patent is:

1. A differential gear for self-propelled vehicles having a bisected rear axle, comprising in combination a driving member, two coupling members, each adapted to be rigidly fixed to one of the coaxial shafts, said driving member being in mesh with one of said coupling members, said members having a great but unequal number of cams on their concentric opposing faces, the inner member having the larger number and preferably but one cam in excess of the outer member, rollers between said faces and engaging simultaneously by the cams of both members, the cams of the inner members being inverted with reference to the outer cams, the angles in which a roller acts on the inner and the outer members being different to produce equal torques on the rear axle parts.

2. Differential gear as claimed in claim 1 in which the difference in the number of curves is not greater than two, but preferably is one only, whereby the difference of the number of curves with respect to the greater number does not exceed 20%.

3. Differential gear as claimed in claim 1, in which by means of a suitable different pitch of both curves, both shaft-halves are subjected to approximately the same torque, and wherein the necessarily greater pitch of the inner curves preferably is attained by providing the inner member with more curves than the outer member.

4. Differential gear as claimed in claim 1, in which for the purpose of obtaining most favorable conditions, upon selection of a locking means-number of five, the outer member is provided with seven curves and the inner member with eight curves, or the like proportions.

In witness whereof I affix my signature.

HERMANN KNAB.